United States Patent [19]

Morris

[11] Patent Number: 4,757,849

[45] Date of Patent: Jul. 19, 1988

[54] WORK BENCH WORK SURFACE EXTENSION APPARATUS

[76] Inventor: James S. Morris, Site 116, Compartment 21, R.R. #1, Parksville, British Columbia, Canada, V0R 2S0

[21] Appl. No.: 110,131

[22] Filed: Oct. 19, 1987

[51] Int. Cl.[4] .................... B23H 1/02

[52] U.S. Cl. .................... 144/287; 108/97; 269/139

[58] Field of Search .................... 83/471.2, 471.3, 486, 83/856; 144/286 R, 287, 1 R, 286 A; 108/97, 138

[56] References Cited

U.S. PATENT DOCUMENTS

| | | | |
|---|---|---|---|
| 1,657,917 | 1/1928 | Danielson | 108/97 X |
| 2,647,483 | 8/1953 | Price | 144/287 X |
| 3,741,131 | 6/1973 | Lendbetter | 108/97 |
| 4,061,323 | 12/1977 | Beekenkamp . | |
| 4,068,551 | 1/1978 | Kreitz . | |
| 4,291,869 | 9/1981 | Hickman . | |
| 4,328,846 | 5/1982 | Hanson . | |

*Primary Examiner*—W. Donald Bray
*Attorney, Agent, or Firm*—Baker, Maxham & Jester

[57] ABSTRACT

A work bench work surface extension apparatus comprises first, second, third and fourth extension members. First and second releasable attaching means releasably attach one end of each of the first and second members to one side of a work bench work surface such that the opposite ends of the members extend across the surface and project outwardly from its opposite side. Third and fourth releasable attaching means releasably attach one end of each of the third and fourth extension members to the opposite side of the work surface, such that the opposite ends of the third and fourth members project outwardly from that opposite side of the work surface. A work surface extension member can thus be supported between the extension members.

8 Claims, 2 Drawing Sheets

WORK BENCH WORK SURFACE EXTENSION APPARATUS

FIELD OF THE INVENTION

This application pertains to apparatus for extending the working surface of a work bench such as the popular WORKMATE TM work bench to facilitate the handling of large work pieces.

BACKGROUND OF THE INVENTION

Compact, inexpensive work benches, of which the well-known WORKMATE TM work bench is perhaps the best example, have become quite popular with home handymen and with some tradesmen. The WORKMATE TM work bench can quickly be manipulated from its collapsed storage position into its operating position for use in a wide variety of situations including support of work pieces for sawing, drilling, hammering, painting, etc. The popularity of the WORKMATE TM work bench has spawned a number of devices which are designed for use with the WORKMATE TM work bench in order to accomodate it to specific tasks. See for example U.S. Pat. No. 4,291,869 issued Sept. 29, 1981 for an invention of Ronald P. Hickman which illustrates how a metal-worker's vice, a saw-table and a drill may be adapted for use with a work bench of the WORKMATE TM type.

Problems have been encountered in attempts to use WORKMATE TM type work benches with large work pieces such as cabinet doors. The conventional WORKMATE TM work bench has a relatively small working surface area in comparison to the surface area of a typical cabinet door. Accordingly, conventional WORKMATE TM type work benches do not provide adequate support for large work pieces such as cabinet doors. U.S. Pat. No. 4,328,846 issued 11 May, 1982 for an invention of Palmer C. Hanson entitled "Extension Assembly for a Work Bench" describes and illustrates one form of work bench work surface extension assembly which is specifically adapted for use with WORKMATE TM type work benches. Hanson's apparatus incorporates a pair of vertical upright members which are pivotally connected to horizontal extension members. These however are considered to be relatively cumbersome, and may not afford firm support to the work piece in all situations.

The present invention provides a compact apparatus for extending the work surface and the clamp holding width of a conventional WORKMATE TM type work bench to provide improved support for large work pieces.

SUMMARY OF THE INVENTION

In accordance with the invention there is provided a work bench work surface extension apparatus comprising first, second, third and fourth extension members. First and second releasable attaching means are used to releasably attach one end of each of the first and second members to one side of the work bench work surface such that the opposite ends of the first and second members extend across the work surface and project outwardly from the opposite side thereof. Third and fourth releasable attaching means releasably attach one end of each of the third and fourth extension members to the opposite side of the work bench work surface such that the opposite ends of the third and fourth members project outwardly from that side of the work bench work surface. A work surface extension member can thus be supported between the extension members and a large work piece can in turn be supported on the extended work surface provided by the existing work bench work surface and the work surface extension member.

Fifth and sixth releasable attaching means may be provided for releasably attaching the opposite ends of the first and second extension members to the corresponding opposite ends of the third and fourth extension members.

The releasable attaching means may be pivotally adjustable to enable the first and second extension members to pivot in a plane generally parallel to the work bench work surface and to enable the third and fourth extension members to pivot in another plane generally parallel to the work surface.

Preferably, the third and fourth releasable attaching means are adapted to mount flush with the work bench work surface. This may advantageously be accomplished by means of a tapered, threaded plug receivable within a tube provided on one end of each of the third and fourth extension members and threadably engageable by a screw.

Advantageously, the first and second extension members may be apertured to facilitate slidable adjustment of those members with respect to the side of the work bench work surface to which they are releasably attached.

DETAILED DESCRIPTION OF THE PREFERRED EMBODIMENT

Figure 1:
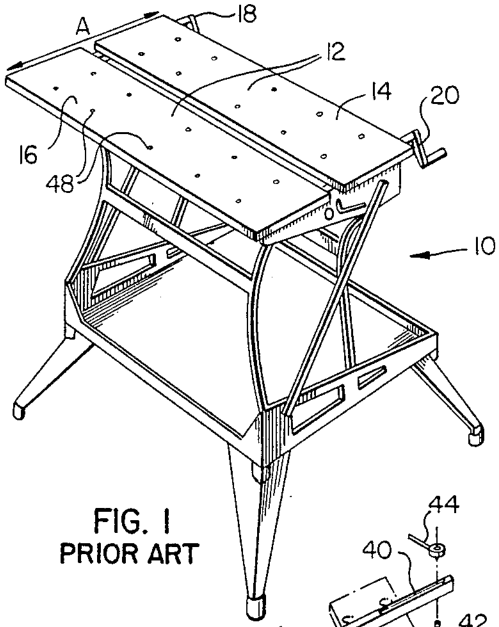
FIG. 1 PRIOR ART
FIG. 1 is a pictorial illustration of a conventional prior art WORKMATE TM type work bench.

FIG. 1 illustrates a conventional prior art WORKMATE TM type work bench 10 having a work surface 12 comprising members 14, 16. Handles 18, 20 are operatively connected to work surface members 14, 16 to facilitate positioning of members 14, 16 relative to one another. That is, by rotating handles 18, 20 the user may separate members 14, 16 from one another to yield a work surface having a maximum dimension (depending upon the particular WORKMATE TM model used) of about 28 inches when measured in the direction of the arrow "A" shown in FIG. 1. Conversely, the user may operate handles 18, 20 to retract work surface members 14, 16 toward one another to yield a work surface having a minimum dimension (again depending on the particular model used) of about 12 inches when measured in the direction illustrated by arrow "A" in FIG. 1. It has been found that even when work surface members 14, 16 are adjusted for maximum separation as aforesaid the work surface thereby provided is insufficient to adequately support large work pieces such as cabinet doors.

Figure 2:
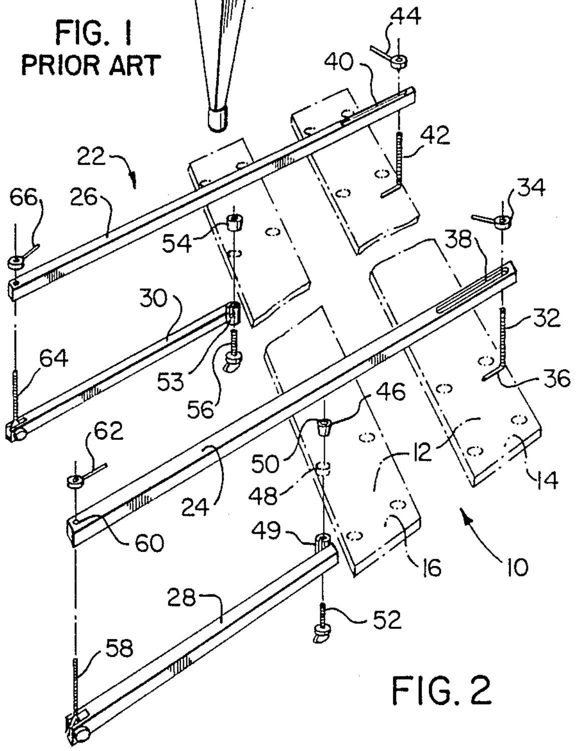
FIG. 2 is an exploded illustration of the work bench work surface extension apparatus of the present invention.
Figure 3:
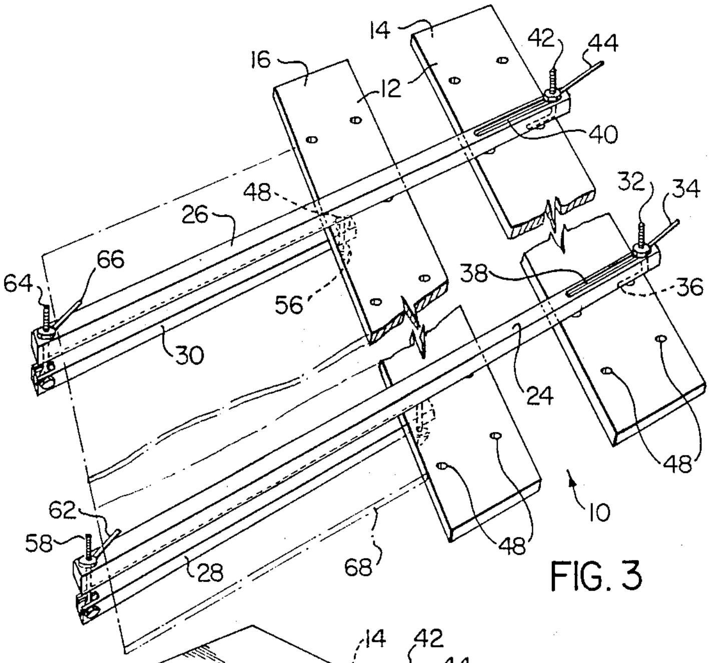
FIG. 3 is a pictorial illustration showing the work bench work surface extension apparatus of FIG. 2 mounted for use on the work bench of FIG. 1.
Figure 4:
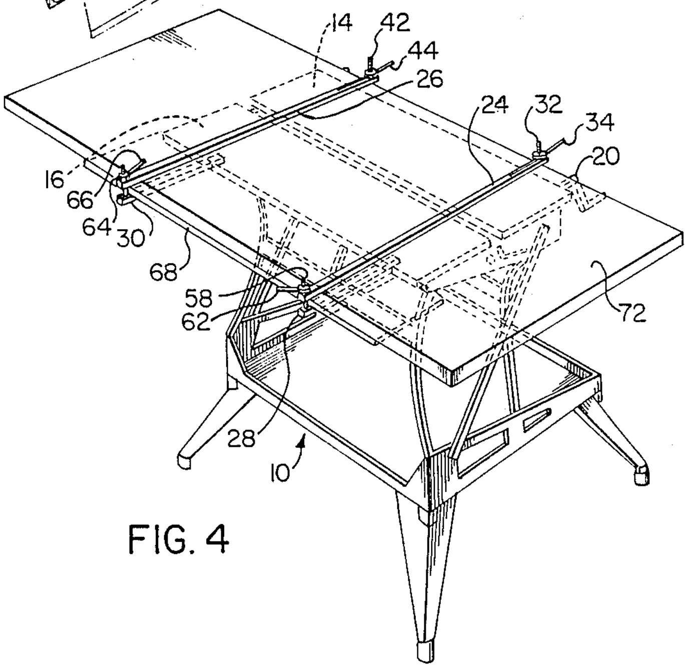
FIG. 4 shows how a large work piece such as a cabinet door may be supported on the work bench of FIG. 1 by the apparatus illustrated in FIG. 3.

The present invention provides a work bench work surface extension apparatus 22 which is illustrated in FIGS. 2 through 4. With the aid of extension apparatus 22 one may quickly and easily extend the working surface of a WORKMATE TM type work bench so that large work pieces such as cabinet doors may be supported and a variety of work operations performed thereon. As illustrated in FIG. 2, extension apparatus 22 comprises first, second, third and fourth extension members 24, 26, 28 and 30. A "first releasable attaching means" comprising bent bolt 32 and wing nut 34 is provided for releasably attaching one end of first extension member 24 to one side of work surface 12 such that the opposite end of first extension member 24 extends across work surface 12 and projects outwardly from the opposite side of the work surface. Head 36 of bent bolt 32 projects at about a right angle to the shank of bent bolt 32 so that bent bolt head 36 may project beneath work surface member 14. The shank of bent bolt 32 is passed through slotted aperture 38 in the end of first extension member 24 such that the threaded end of bent bolt 32 projects above first extension member 24 for threadable receipt thereon of wing nut 34, which may be tightened to securely clamp first extension member 24 against and on top of work surface members 14 and 16 to ensure that the work piece is held in a true horizontal plane. Slotted aperture 38 facilitates slidable adjustment of the end of first extension member 24 relative to the side of work surface member 14. Because the shank of bent bolt 32 is round, first extension member 24 may be pivoted into any desired location in a plane generally parallel to work surface 12 before wing nut 34 is tightened.

Second extension member 26 is provided with a slotted aperture 40 identical to slotted aperture 38 of first extension member 24. A "second releasable attaching means" comprising bent bolt 42 and wing nut 44 which are respectively identical to bent bolt 32 and wing nut 34 is provided for releasably and pivotably attaching one end of second extension member 26 to the side of work surface member 14 at a location spaced away from the point of attachment of first extension member 24, and such that the opposite end of second extension member 26 extends across work surface 12 and projects outwardly therefrom.

A "third releasable attaching means" is provided for releasably attaching one end of third extension member 28 to the side of work surface member 16, such that the opposite end of third extension member 28 projects outwardly from work surface members 14 and 16 as shown in FIG. 3. In the preferred embodiment, the third releasable attaching means comprises a tapered plug 46 which is receivable within a short tube 49 welded to the side of member 28. Tube 49 projects above the upper surface of member 28. Member 28 is positioned beneath work surface member 16 and tube 49 is aligned with one of the apertures 48 conventionally provided in work surface member 16. Tube 49 is then fitted upwardly into the selected aperture 48 and plug 46 is passed downwardly (i.e. from above member 16) into the same aperture 48, so that plug 46 is received within tube 49. Plug 46 has an internally threaded cylindrical aperture 50 which is threadably engageable by a screw 52. Screw 52 is threaded into plug aperture 50 from beneath member 16 and tightened to draw third extension member 28 firmly upward against the undersurface of work surface member 16. This tightening action draws plug 46 downwardly such that its upper surface sits flush with or beneath work surface member 16 to prevent interference with work pieces positioned on work surface 12. The sides of tube 49 are preferably slotted so that the tube expands outwardly and is held firmly within aperture 48 as plug 46 is drawn downwardly into tube 49.

A "fourth releasable attaching means" identical to the third releasable attaching means and comprising tube 53, plug 54 and screw 56 is provided for releasably attaching one end of fourth extension member 30 to the side of work surface member 16 such that the opposite end of extension member 30 projects outwardly therefrom as illustrated in FIG. 3.

Because plugs 46, 54 are round, they may rotate within the apertures provided in work surface member 16. Accordingly, third and fourth extension members 28, 30 may be pivotally adjusted in a plane generally parallel to work surface 12 before screws 52, 56 are tightened to align members 28, 30 at right angles to work surface member 16.

A "fifth releasable attaching means" is provided for releasably attaching the free ends of first and third extension members 24, 28. In the preferred embodiment the fifth releasable attaching means comprises a bolt 58 which is pinned or otherwise securely fastened to the end of third extension member 28 to project at about a right angle therefrom. An aperture 60 is provided in the end of first extension member 24. The threaded end of bolt 58 is passed through aperture 60 and wing nut 62 is then threadably fastened over the protruding end of bolt 58. Because bolt 58 is round and because aperture 60 is sized to allow free passage of bolt 58 therethrough, first extension member 24 may be pivoted in a plane generally parallel to work surface 12 before wing nut 62 is tightened. A "sixth releasable attaching means" comprising bolt 64 and wing nut 66 is provided for releasably and pivotably attaching the protruding opposed ends of second and fourth extension members 26, 30 in identical fashion.

As may be seen in FIG. 3, work surface extension member 68 is fastened to third and fourth extension members 28, 30 to provide an extended work surface projecting off the side of the work surface 12 conventionally provided by work bench 10. Extension member 68 may be provided with a plurality of apertures and co-operating plugs (like apertures 48 and the associated plugs provided with the original WORKMATE TM work bench) to extend the utilitary capability of the work surface over its entire extended area. As may be seen in FIG. 4, a large work piece such as a cabinet door 72 may easily be laid atop the extended work surface and supported thereby for the performance of a variety of working operations on door 72.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Work bench work surface extension apparatus, comprising:

(a) first and second extension members;

(b) first and second releasable attaching means for releasably attaching one end of each of said members to one side of said work bench work surface, such that the opposite ends of said members extend across said surface and project outwardly from the opposite side of said surface;

(c) third and fourth extension members; and, (d) third and fourth releasable attaching means for releasably attaching one end of each of said third and fourth extension members to said opposite side of said surface, such that the opposite ends of said members project outwardly from said opposite side;

whereby a work surface extension member is supportable between said extension members.

2. Work bench work surface extension apparatus as defined in claim 1, further comprising fifth and sixth releasable attaching means for releasably attaching said opposite ends of said third and fourth members respectively.

3. Work bench work surface extension apparatus as defined in claim 2, wherein said first and second releasable attaching means are pivotally adjustable to enable said first and second members to pivot in a plane generally parallel to said work surface.

4. Work bench work surface extension apparatus as defined in claim 3, wherein said third and fourth releasable attaching means are pivotally adjustable to enable said third and fourth members to pivot in a plane generally parallel to said work surface.

5. Work bench work surface extension apparatus as defined in claim 4, wherein said fifth and sixth releasable attaching means are pivotally adjustable to enable said first and second members to pivot in a plane generally parallel to said work surface.

6. Work bench work surface extension apparatus as defined in claim 1, wherein said third and fourth releasable attaching means are adapted to mount flush with said work surface.

7. Work bench work surface extension apparatus as defined in claim 6, wherein said third and fourth releasable attaching means each comprise a tapered, threaded plug receivable within a tube provided on said one end of said third or fourth extension member respectively, and threadably engageable by a screw.

8. Work bench work surface extension apparatus as defined in claim 1, wherein said one ends of said first and second members are apertured to facilitate slidable adjustment of said one ends with respect to said one side of said surface.

* * * * *